(12) United States Patent
Ilani et al.

(10) Patent No.: US 11,681,581 B1
(45) Date of Patent: Jun. 20, 2023

(54) DATA INTEGRITY PROTECTION WITH PARTIAL UPDATES

(71) Applicant: Western Digital Technologies, Inc., San Jose, CA (US)

(72) Inventors: Ishai Ilani, Dolev (IL); Ran Zamir, Ramat Gan (IL); Karin Inbar, Ramat Hasharon (IL); Eran Sharon, Rishon Lezion (IL); Idan Alrod, Herzliya (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/845,770

(22) Filed: Jun. 21, 2022

(51) Int. Cl.
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0659* (2013.01); *G06F 3/0673* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 6,125,469 A | * | 9/2000 | Zook | G11B 20/1833 714/769 |
| 7,111,228 B1 | * | 9/2006 | Ricci | G06F 11/1076 714/807 |
| 11,250,891 B1 | * | 2/2022 | Golov | G06F 21/602 |
| 2007/0005991 A1 | * | 1/2007 | Kober | G06F 21/572 713/193 |
| 2009/0006886 A1 | * | 1/2009 | O'Connor | G06F 11/108 714/E11.034 |
| 2011/0041030 A1 | * | 2/2011 | Ko | H03M 13/095 714/752 |
| 2013/0061110 A1 | * | 3/2013 | Zvibel | G06F 11/1004 714/E11.03 |
| 2014/0281134 A1 | * | 9/2014 | Eitan | G06F 12/0246 711/103 |
| 2016/0344410 A1 | * | 11/2016 | Dubey | H03M 13/091 |
| 2016/0350175 A1 | * | 12/2016 | Nazari | G06F 3/0673 |
| 2017/0187389 A1 | * | 6/2017 | Radhakrishnan | H03M 13/091 |
| 2021/0141685 A1 | * | 5/2021 | Li | G06F 11/0793 |

OTHER PUBLICATIONS

J.-H. Lee, "CRC (Cyclic Redundancy Check) Implementation in High-Speed Semiconductor Memory," 2015 8th International Conference on Control and Automation (CA), Jeju, Korea (South), 2015, pp. 17-20, doi: 10.1109/CA.2015.13. (Year: 2015).*

* cited by examiner

*Primary Examiner* — Daniel F. McMahon
(74) *Attorney, Agent, or Firm* — Patterson + Sheridan, LLP; Steven H. VerSteeg

(57) ABSTRACT

Effective use of cyclic redundancy check (CRC) signatures is achieved where each sector of a flash management unit (FMU) has a distinct CRC signature. The CRC signatures are XORed together to create a total CRC signature for the FMU. When a host device updates a single sector of the FMU, the CRC signature for the updated single sector can be changed by removing the old CRC signature corresponding to the single sector and replacing the old CRC signature with a new CRC signature corresponding to the updated single sector. The old CRC signature is XORed from the total CRC signature and then the new CRC signature is XORed with the remaining CRC signatures to create a new total CRC signature. In so doing, data integrity is ensured.

20 Claims, 5 Drawing Sheets

DATA INTEGRITY PROTECTION WITH PARTIAL UPDATES

BACKGROUND OF THE DISCLOSURE

Field of the Disclosure

Embodiments of the present disclosure generally relate to updating selected portions of a cyclic redundancy check (CRC) signature corresponding to a flash management unit (FMU).

Description of the Related Art

In enterprise storage systems, data integrity is one of the requirements and demands extremely low probabilities for occurrences of undetected data corruption. There are many potential causes for data corruption such as memory device defects, bus failures, cosmic radiation, firmware (FW) bugs, etc.

The common way for ensuring data integrity and detecting any corruption of the user data is by adding a short cyclic redundancy check (CRC) signature that is attached to the data. A well-designed CRC code will detect any change to the data with a high probability, and the data corruption will be detected. Furthermore, a CRC code can offer a deterministic detection capability up to a small number of errors included in the payload. There are trade-offs in designing a CRC code in determining the length of the payload and the length of the CRC signature. A larger signature provides better detection capability, however, takes precious memory device resources to store. A flash management unit (FMU) typically is 4 KB and is larger than the minimal accessible unit, which is a sector. A sector is typically 512B. For a given CRC size, using a larger payload (e.g. 4 KB FMU instead of 512B sector) will reduce the overhead wasted on CRC protection, however, this also means that to calculate and check the CRC, the full payload will have to be used, which can complicate the write flow when only partial-FMU is being written (e.g., 1 sector).

Therefore, there is a need in the art to more effectively utilize CRC signatures to ensure data integrity.

SUMMARY OF THE DISCLOSURE

The present disclosure generally relates to a more effective use of cyclic redundancy check (CRC) signatures. Each sector of a flash management unit (FMU) has a distinct CRC signature. The CRC signatures are XORed together to create a combined CRC signature for the FMU. When a host device updates a single sector of the FMU, the CRC signature for the updated single sector can be changed by removing the old CRC signature corresponding to the single sector and replacing the old CRC signature with a new CRC signature corresponding to the updated single sector. The old CRC signature is XORed from the total CRC signature and then the new CRC signature is XORed with the remaining CRC signatures to create a new total CRC signature. In so doing, data integrity is ensured.

In one embodiment, a data storage device comprises: a memory device; and a controller coupled to the memory device, wherein the controller is configured to: calculate a first CRC signature for a first sector of a FMU within the memory device; calculate a second CRC signature for a second sector of the FMU; combine the first CRC signature and the second CRC signature into a total CRC signature for the FMU; calculate a new second CRC signature; and combining the new second CRC signature with the first CRC signature to create a new total CRC signature.

In another embodiment, a data storage device comprises: a memory device; and a controller coupled to the memory device, wherein the controller is configured to: remove at least one sector CRC signature corresponding to at least one sector from a total CRC signature to result in a partial CRC signature; calculate a new CRC signature for the at least one sector; and combine the new CRC signature with the partial CRC signature.

In another embodiment, a data storage device comprises: a memory means; and a controller coupled to the memory means, wherein the controller is configured to: update a total CRC signature for a FMU of the memory means by removing an outdated CRC signature corresponding to a sector of the FMU and adding in a new CRC signature corresponding to the sector.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to more effective use of cyclic redundancy check (CRC) signatures. Each sector of a flash management unit (FMU) has a distinct CRC signature. The CRC signatures are XORed together to create a total CRC signature for the FMU. When a host device updates a single sector of the FMU, the CRC signature for the updated single sector can be changed by removing the old CRC signature corresponding to the single sector and replacing the old CRC signature with a new CRC signature corresponding to the updated single sector. The old CRC signature is XORed from the total CRC signature and then the new CRC signature is XORed with the remaining CRC signatures to create a new total CRC signature. In so doing, data integrity is ensured.

Figure 1:
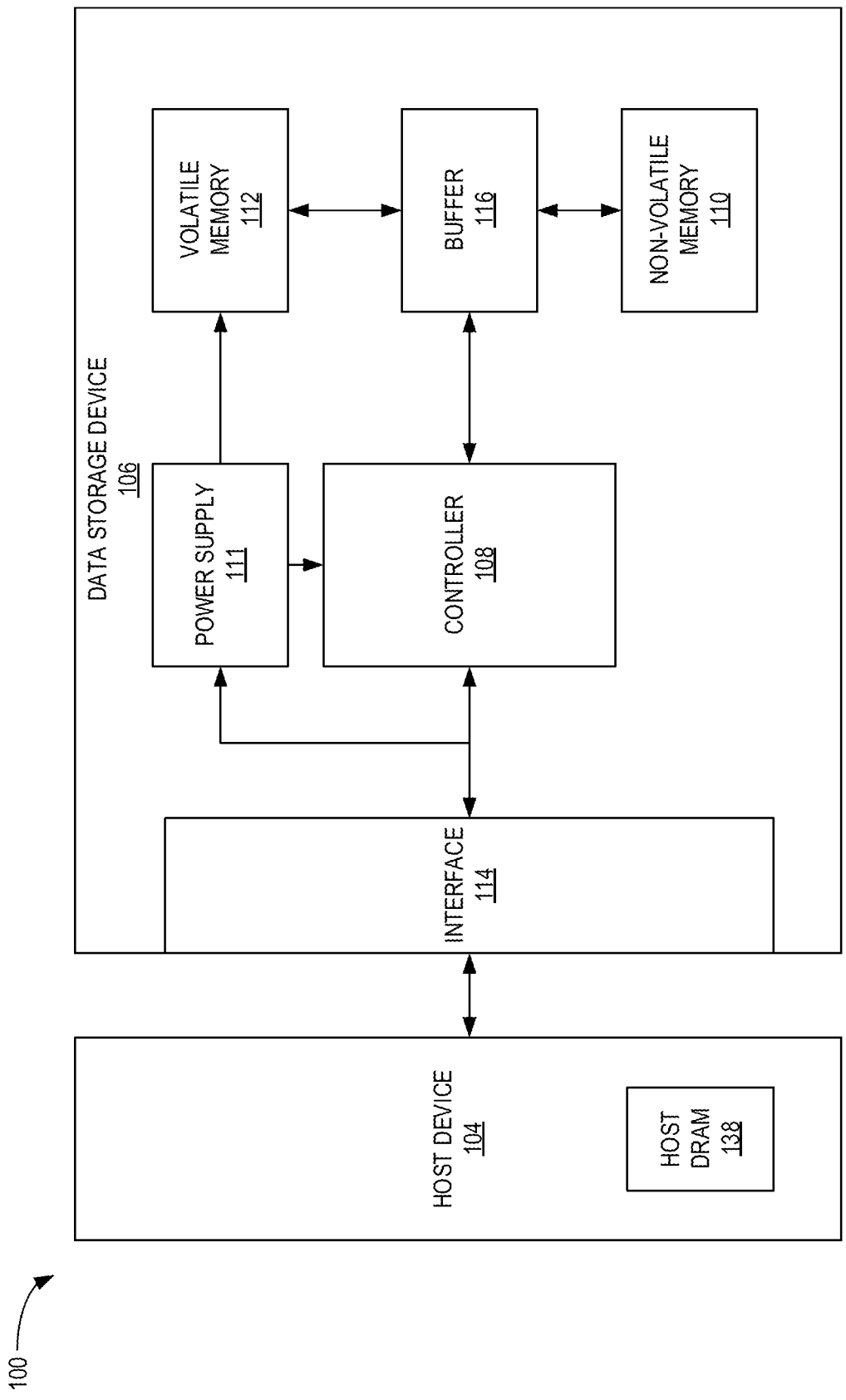
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

As will be discussed herein, the instant disclosure deals with data integrity protection in enterprise applications and specifies the scheme that is chosen to be implemented in an enterprise platform. The disclosure includes novel ways to calculate and update the CRC signatures while also allowing for partial FMU updates, providing superior error detection capability while using less bits for CRC signatures compared to previously used schemes.

One of the pain points in designing a data protection scheme is that the host can read/write in sectors (~512B) while the data storage device manages the data in ~4 KB FMUs which may result in partial updates of FMUs when not all sectors are updated. In some controllers, there are distinct CRC signatures per 512B sector. Distinct CRC signatures are inefficient in terms of the high number of bytes used for CRCs because there is a need to store a CRC signature for each corresponding sectors per FMU (e.g., 8 CRC signatures for 8 sectors in a FMU). Additionally, distinct CRC signatures may be inefficient due to a smaller signature being used in order to reduce Bytes used for CRC signatures, e.g., 2 bytes rather than 4 bytes for the CRC signature. Therefore, distinct CRC signatures require more Bytes to be used for signatures and may provide a weaker error detection capability.

Figure 2A:
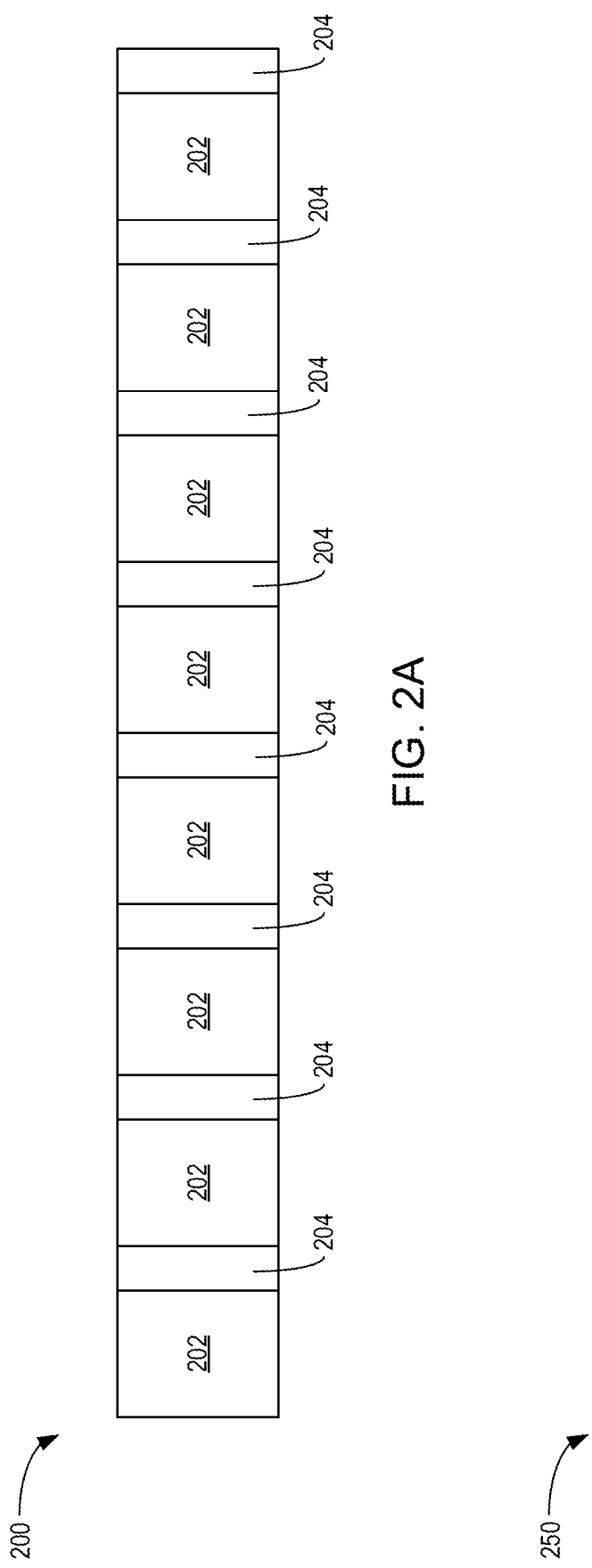
FIG. 2A is a schematic illustration of cyclic redundancy check (CRC) protection on a per sector basis.

FIG. 2A is a schematic illustration of an example of a cyclic redundancy check (CRC) protection on a per sector basis. As shown in FIG. 2A, the data sectors 202 are all approximately 512 bytes within the FMU 200 while the CRC signatures 204 are each 2 bytes and written adjacent to the sector 202 corresponding to the CRC signature 204. In the embodiment of FIG. 2A, there are 16 bytes for the FMU 200.

Figure 2B:
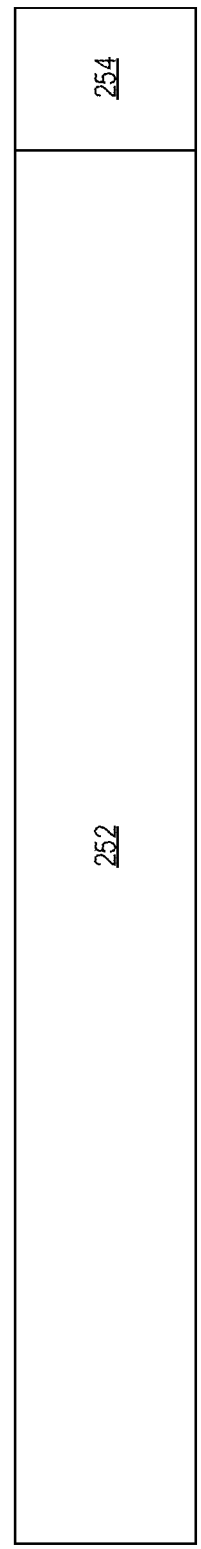
FIG. 2B is a schematic illustration of CRC protection on a per flash management unit (FMU) basis.

FIG. 2B is a schematic illustration of an example of a CRC protection on a per flash management unit (FMU) basis. In FIG. 2B, the FMU 250 has one large continuous section 252 of approximately 4 KB and the CRC signature 254 is 4 bytes. The challenge with using a single CRC signature is supporting the update of a subset of sectors of the FMU which results in a read-modify-write (RMW) operation. On the one hand there is a need to re-calculate the 4 byte CRC signature 254 of the FMU 250 after merging the new data with the old data in the section 252. If the data was updated and the entire CRC signature 254 was recalculated for the full FMU, there is an instance where the data is left unprotected without a valid CRC signature. In such a scenario, any bit flips occurring after verifying the CRC signature of the old data and before calculating the new CRC will not be detected. As will be discussed herein, updating the 4 byte CRC signature 254 without losing data protection is possible.

Figure 3:
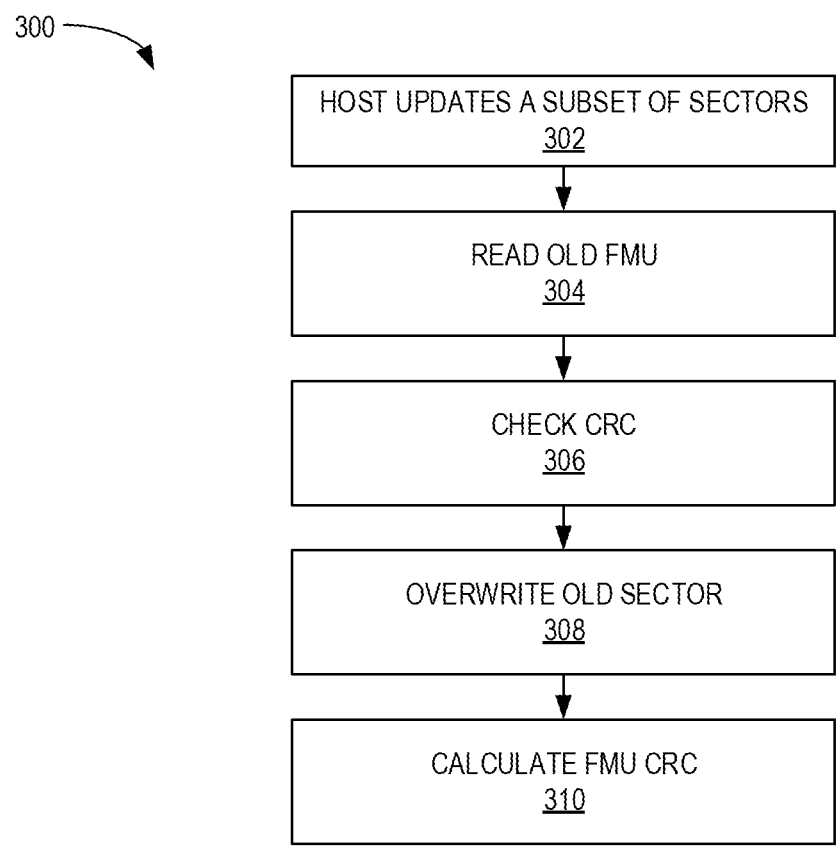
FIG. 3 is flowchart illustrating a read modify write flow operation.

FIG. 3 is flowchart 300 illustrating a read modify write flow operation where data is left unprotected. Initially, a host device updates a subset sectors of a FMU at 302, and the entire FMU is read at 304. The CRC signature is then checked at 306 followed by overwriting the old sector with the new data at 308. Finally, the new CRC signature for the FMU is calculated at 310 and stored. After the CRC signature is checked at 306 and the new CRC signature is calculated at 310, the data is not protected. Any bit flip occurring between 306 and 310 will not be detected and will be included in the new FMU CRC signature calculation. That is, the new CRC signature will include these bit-flips.

In this disclosure, a novel method for calculating the CRC signature on a full 4 KB FMU is disclosed, while also supporting an update process for just a subset of sectors without recalculating the CRC contribution for the unchanged sectors, therefore avoiding any gaps in data protection for these sectors. Additionally, the processes of the read and write flows of the device are also discussed. The CRC contribution calculation of each sector is discussed and is denoted as the "sector CRCs" while the FMU CRC signature can be represented as the XOR of the sector CRCs. The calculation occurs according to the following formula where $CRC_i$ are the sector CRCs. It is to be noted that the formula exemplifies 8 sectors with the last sector being 7 and is merely for exemplification purposes. Generally, the last sector CRC signature will be $CRC_{number\ of\ sectors-1}$:

$$CRC_{signature}=CRC_0 \oplus CRC_1 \oplus \ldots \oplus CRC_7$$

The method simplifies the system read-modify-write flows when the host device updates a single sector or a subset of the sectors in an FMU and provides superior data protection as the CRC contribution of the other sectors is unchanged and there is a no point in which the data is left unprotected which would happen if we recalculated the CRC entirely.

Figure 4:
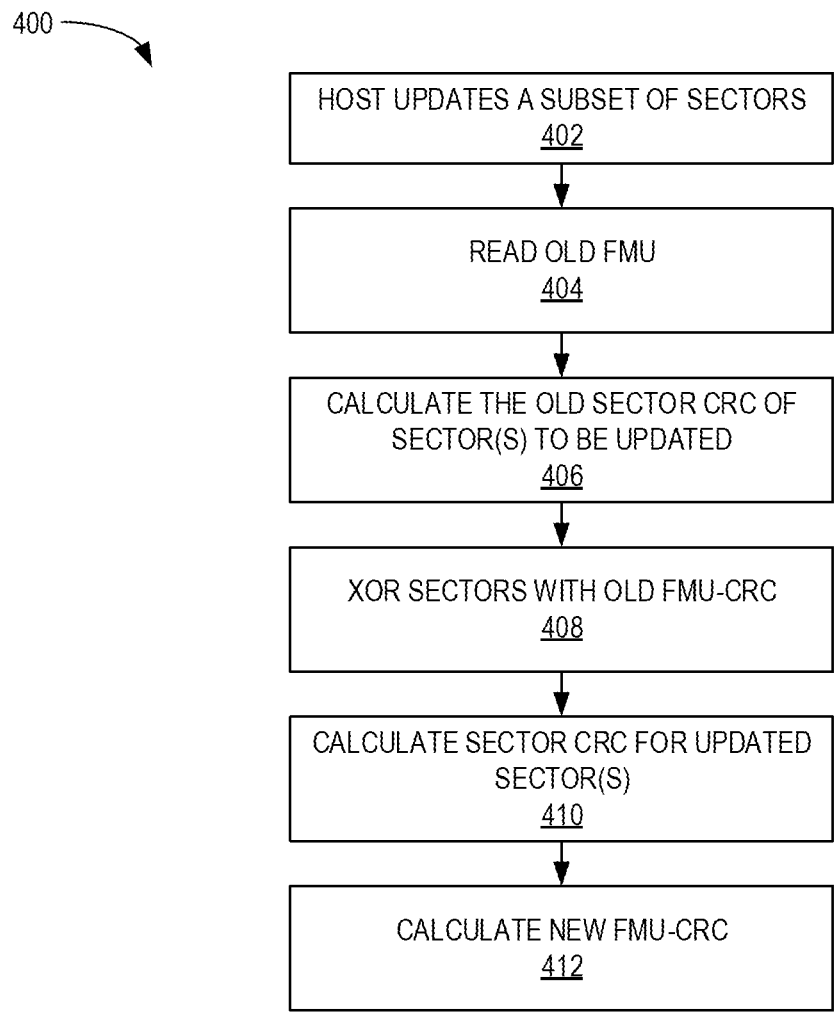
FIG. 4 is a flowchart illustrating a read modify write flow operation according to one embodiment.

FIG. 4 is a flowchart 400 illustrating a read modify write flow operation according to one embodiment. Initially, a host device updates a subset of sectors of a FMU at 402, and the entire FMU is read at 404. The sector CRC of the sector(s) to be updated is then calculated at 406. Thereafter, the newly calculated old sector CRCs of the sector(s) to be updated are XORed with the old FMU-CRC at 408 which will result in the FMU CRC without the contributions of the updated sector(s) (i.e., FMU-CRC$_{w/o\ updated\ sectors}$=FMU-CRC$_{old}$+sector-CRC$_{old}$). Thereafter, the sector CRC for the updated sector(s) is calculated at 410. Finally, the newly calculated CRCs for the updated sector(s) are XORed with the FMU-CRC at 412 (i.e., FMU-CRC$_{new}$=FMU-CRC$_{w/o\ updated\ sectors}$+sector CRC$_{new}$). The CRC signature contribution of the unchanged sectors is unchanged. Any bit flip in the unchanged sectors will be discovered without risk of error repeating. Only the contribution of the updated sector to the total CRC signature is updated.

As each 4K FMU can be viewed as 8*512B sectors, the 4 byte CRC signature will be calculated as the XOR of eight "sector CRCs" signatures. Each sector CRC signature is calculated over each sector separately, while the end-result will be the XOR operation applied over the eight 4 byte CRC signature of all sectors. The resulting CRC signature will be identical to the result using the normal full FMU method. It is to be noted that the description herein of 4K FMU and 8*512B sectors and 4 byte CRC signatures is merely an example and that other sizes are contemplated such as sectors that are a bit larger than 512B and FMU larger than 4K.

When the host device writes a partial-FMU, the firmware (FW) needs to read the old FMU data stored in the memory device (e.g., NAND) and overwrite the sectors that the host device updated with the new data. When the controller reads the new data from host device, the controller calculates the CRC signature of the new data. If the new data is a partial-FMU that is, a subset of the sectors in the FMU, then the combined CRC signature for this partial-FMU is the XOR result of the CRC signature of each sector, even though the number of sectors is less than 8.

While reading the old FMU, the controller validates the CRC signature of the old data by calculating the CRC signature of each sector, XORing the results, and comparing to the CRC signature that was stored in the memory device (e.g., NAND). To support RMW flow, during this process, the controller will also store the intermediate results of the per-sector CRC calculation.

When the controller merges the new data with the old data, the FW should also XOR the CRC signature of the old sectors that should remain and the CRC signatures of the new sectors. The result is the combined CRC signature (e.g., total CRC signature) for the FMU that should be stored in the memory device (e.g., NAND). Since the CRC signatures of all sectors were already verified by the controller, then data is not left unprotected at any stage.

Figure 5:
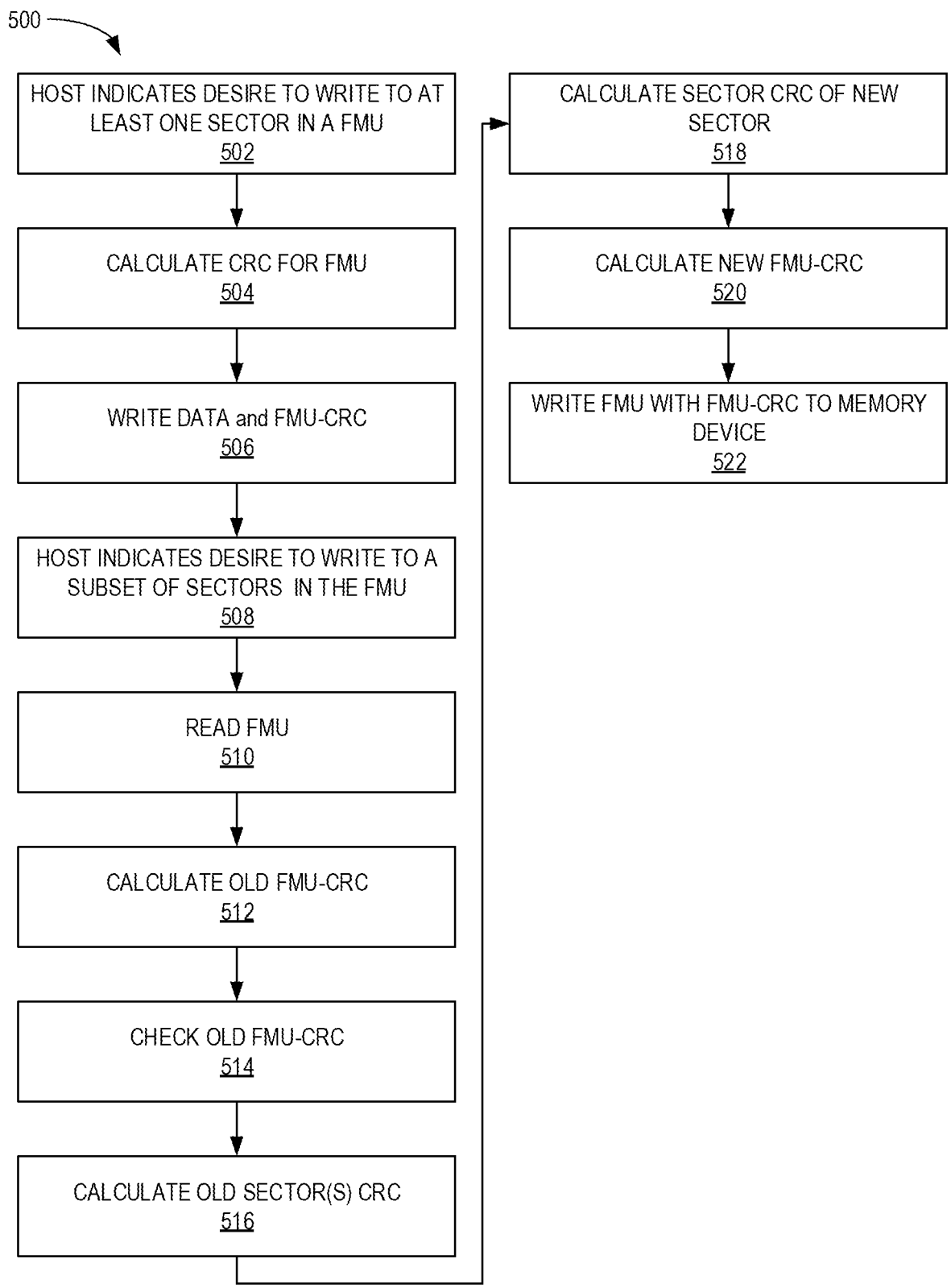
FIG. 5 is a flowchart illustrating a more detailed read modify write flow operation according to one embodiment.

FIG. 5 is a flowchart 500 illustrating a more detailed read modify write flow operation according to one embodiment. Initially, the host device indicates a desire to write to at least one sector of an FMU at 502 and the controller receives the indication. The controller calculates the FMU-CRC at 504 and writes the data and FMU-CRC to the storage device at 506. The host device then indicates a desire to write to a subset of sectors of the same FMU at 508 and the controller receives the indication. The controller reads the FMU from the memory device at 510 and calculates the old FMU-CRC and 512. The controller then checks the FMU-CRC at 514. The controller then calculates the old sector CRC of the sector(s) to be updated at 516. The controller then calculates the sector CRC of the indicated new sectors at 518 followed by calculating the new FMU-CRC at 520 according to the following formula: FMU-CRC$_{new}$=FMU-CRC+sector-CRC$_{old}$+sector-CRC$_{new}$. It is to be noted that the formula is applicable to the situation where only one sector is to be updated. Thereafter, the controller writes the FMU with the new FMU-CRC to the memory device at 522.

Calculating the CRC signature, and how to do so to obtain the proper CRC code, is valuable. The paragraphs below describe the calculation using an example of XORing eight separate sector CRCs to obtain the proper CRC signature.

The CRC signature is a linear code that is usually represented by a generator polynomial:

$$g(x)=x^m+g_{m-1}x^{m-1}+\ldots+g_1x+g_0$$

Where m is the CRC length in bits, k is the FMU length in bits, l=k/8 (i.e., 8 being an example of 8 sectors) which is the sector length in bits, and n=k+m which is the total code word length, which is the payload plus the CRC signature. The payload is also represented as a polynomial where $d_i$ and $d_0$ are bits of the payload.

$$m(x)=d_{k-1}x^{k-1}+\ldots+d_1x+d_0$$

The CRC signature is defined as the remainder of the polynomial division of the message (i.e., payload) polynomial m(x) multiplied by $x^m$ with the generating polynomial g(x):

$$C(x)=x^m \cdot m(x) \bmod g(x)$$

C(g), which is the m x m companion matrix of g(x) is given by:

$$C(g) = \begin{bmatrix} g_{m-1} & 1 & \ldots & 0 & 0 \\ \vdots & \vdots & 1 & \vdots & \vdots \\ g_2 & 0 & \ldots & \ddots & 0 \\ g_1 & 0 & \ldots & 0 & 1 \\ g_0 & 0 & \ldots & 0 & 0 \end{bmatrix}$$

And we can describe a normal CRC calculation by:

$$CRC_{signature}=d \cdot G_p^T$$

(multiplication is modulo-2)

Where d is the ix k payload and $G_p$ is the m x k part of the CRC code generator matrix:

$$H_{CRC}=[C(g)^{(k/m) \cdot m}, C(g)^{2 \cdot m}, C(g)^m, I_m]=[G_p|I_m]$$

$$G_{CRC}=[I_k|G_p^T]$$

$$G_p=[C(g)^{(k/m) \cdot m}, \ldots, C(g)^{2 \cdot m} C(g)^m]$$

The 1×k payload d is defined in terms of sectors d=[$d_7$, $d_6$, ..., $d_0$], each of length l=k/8 bits. We can then rewrite the CRC calculation in terms of sectors:

(multiplications are modulo-2)

$$CRC_{signature} =$$

$$d \cdot G_p^T = [d_7 \ldots d_1\ d_0] \begin{bmatrix} G_7^T \\ \vdots \\ G_1^T \\ G_0^T \end{bmatrix} = \underbrace{d_0 G_0}_{C_0} \oplus$$

-continued $$\underbrace{d_1 G_1}_{C_1} \oplus \ldots \oplus \underbrace{d_7 G_7}_{C_7} = C_0 \oplus C_1 \oplus \ldots \oplus C_7$$

$$G_1 = [C(g)^{(l/m) \cdot m}, \ldots, C(g)^{2m},$$

$$C(g)^m] \cdot C(g)^{l \cdot i}$$

and now determine that the CRC signature is the XOR of the "sector CRC signatures": $C_0, C_1, \ldots, C_7$. where the sector-CRCs can be calculated by multiplying the data of each sector i, $d_i$ with $G_i$ given above.

In this representation, it is easy to see that to update a single sector i, the CRC signature can be updated by "deXORing" the old signature $C_i^{old}$ and XORing the new signature of $C_i^{new}$.

$$CRC_{signature}^{new} = CRC_{signature}^{old} \oplus C_i^{old} \oplus C_i^{new}$$

To calculate the "sector CRCs", the $C(g)^{\wedge}(l*i)$ needs to be calculated where/is the sector size and i is the sector index. So, the CRC module needs to store eight m×m binary matrices in total. The straightforward approach is to calculate these matrices offline and store then in RAM. There is an improved method for calculating the sector CRC signatures by calculating these eight matrices by building them using the binary representation of the sector index i=0, 1, . . . , 7. In this method, only three ($\log_2 8$) matrices $C(g)^{\wedge}I$, $C(g)^{\wedge}2I$, $C(g)^{\wedge}4I$ are kept and any of the eight matrices can be created by multiplication of the three building block matrices. Generally, this method allows keeping only log $2(N_{sectors})$ matrices instead of $N_{sectors}$ matrices, significantly reducing the RAM required for storing them ($N_{sector}$=number of sectors). Examples:

For i=5(101): $C(g)^{\wedge}5I=C(g)^{\wedge}I*C(g)^{\wedge}4I$

For i=5(110): $C(g)^{\wedge}6I=C(g)^{\wedge}2I*C(g)^{\wedge}4I$

By replacing the CRC signature of only the sector being updated rather than recalculating the total CRC signature of the FMU, superior error detection capability is obtained; the number of bits used for CRC signatures is reduced from 16 bytes/FMU to 4 bytes/FMU; and undetected errors are not introduced as part of the update process to maintain end-to-end data protection by avoiding recalculation of the total CRC signature from the unchanged sectors.

In one embodiment, a data storage device comprises: a memory device; and a controller coupled to the memory device, wherein the controller is configured to: calculate a first cyclic redundancy check (CRC) signature for a first sector of a flash management unit (FMU) within the memory device; calculate a second CRC signature for a second sector of the FMU; combine the first CRC signature and the second CRC signature into a total CRC signature for the FMU; calculate a new second CRC signature; and combining the new second CRC signature with the first CRC signature to create a new total CRC signature. The controller is configured to calculate the first CRC signature and the second CRC signature and the new second CRC signature using matrices, wherein a number of matrices maintained by the controller is equal to $\log_2 N_{sectors}$ where $N_{sectors}$ is a number of sectors for the FMU. The number of sectors is equal to 8, wherein the number of matrices is 3, and wherein the matrices correspond to first, second, and fourth sectors. Combining the first CRC signature and the second CRC signature into a total CRC signature comprises XORing the first CRC signature and the second CRC signature. The controller is configured to receive an indication that a host device wants to update the second sector of the FMU. The controller is configured to read the FMU in response to the indication and overwrite the second sector. Receiving the indication occurs after the combining the first CRC signature and the second CRC signature into a total CRC signature, wherein the controller is configured to recalculate the second CRC signature and calculate the new second CRC signature prior to overwriting the second sector and after reading the FMU. Reading the FMU comprises validating the total CRC signature by recalculating the first CRC signature and the second CRC signature. Reading the FMU comprises comparing the total CRC signature to a CRC signature stored in the memory device in a different location. The controller is configured to store the first CRC signature, the second CRC signature, and the new second CRC signature in the controller separate from the memory device. The controller is configured to receive a request from a host device to write a subset of sectors in the FMU; read the total CRC signature; check the total CRC signature; calculate an old sector CRC signature; calculate a new sector CRC signature; calculate the new total CRC signature by XORing the old sector CRC signature and the new sector CRC signature with the total CRC signature; and adding the new total CRC signature to a payload.

In another embodiment, a data storage device comprises: a memory device; and a controller coupled to the memory device, wherein the controller is configured to: remove at least one sector cyclic redundancy check (CRC) signature corresponding to at least one sector from a total CRC signature to result in a partial CRC signature; calculate a new CRC signature for the at least one sector; and combine the new CRC signature with the partial CRC signature. The removing comprises XORing the at least one CRC signature from the total CRC signature. Combining the new CRC signature with the partial CRC signature comprises XORing the new CRC signature with the partial CRC signature to create a new total CRC signature. The controller is configured to store the total CRC signature at an end of a flash management unit (FMU). The removing occurs during a read modify write procedure. The removing occurs prior to overwriting the at least one sector and after recalculating the at least one sector CRC signature. The combining occurs after the overwriting.

In another embodiment, a data storage device comprises: a memory means; and a controller coupled to the memory means, wherein the controller is configured to: update a total cyclic redundancy check (CRC) signature for a flash management unit (FMU) of the memory means by removing an outdated CRC corresponding to a sector of the FMU and adding in a new CRC signature corresponding to the sector. The controller is configured to validate the total CRC signature prior to updating the total CRC signature. Updating comprises XORing the new CRC signature and XORing the outdated CRC signature.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   calculate a first cyclic redundancy check (CRC) signature for a first sector of a flash management unit (FMU) within the memory device;

calculate a second CRC signature for a second sector of the FMU;
combine the first CRC signature and the second CRC signature into a total CRC signature for the FMU;
calculate a new second CRC signature; and
combine the new second CRC signature with the first CRC signature to create a new total CRC signature.

2. The data storage device of claim 1, wherein combining the first CRC signature and the second CRC signature into a total CRC signature comprises XORing the first CRC signature and the second CRC signature.

3. The data storage device of claim 1, wherein the controller is configured to receive an indication that a host device wants to update the second sector of the FMU.

4. The data storage device of claim 3, wherein the controller is configured to read the FMU in response to the indication and overwrite the second sector.

5. The data storage device of claim 4, wherein receiving the indication occurs after the combining the first CRC signature and the second CRC signature into a total CRC signature, wherein the controller is configured to recalculate the second CRC signature and calculate the new second CRC signature prior to overwriting the second sector and after reading the FMU.

6. The data storage device of claim 4, wherein reading the FMU comprises validating the total CRC signature by recalculating the first CRC signature and the second CRC signature.

7. The data storage device of claim 6, wherein reading the FMU comprises comparing the total CRC signature to a CRC signature stored in the memory device in a different location.

8. The data storage device of claim 7, wherein the controller is configured to store the first CRC signature, the second CRC signature, and the new second CRC signature in the controller separate from the memory device.

9. The data storage device of claim 1, wherein the controller is configured to calculate the first CRC signature and the second CRC signature and the new second CRC signature using matrices, wherein a number of matrices maintained by the controller is equal to $\log_2 N_{sectors}$ where $N_{sectors}$ is a number of sectors for the FMU, wherein the number of sectors is equal to 8, wherein the number of matrices is 3, and wherein the matrices correspond to first, second, and fourth sectors.

10. The data storage device of claim 1, wherein the controller is configured to:
receive a request from a host device to write a subset of sectors in the FMU;
read the total CRC signature;
check the total CRC signature;
calculate an old sector CRC signature;
calculate a new sector CRC signature;
calculate the new total CRC signature by XORing the old sector CRC signature and the new sector CRC signature with the total CRC signature; and
adding the new total CRC signature to a payload.

11. A data storage device, comprising:
a memory device; and
a controller coupled to the memory device, wherein the controller is configured to:
remove at least one sector cyclic redundancy check (CRC) signature corresponding to at least one sector from a total CRC signature to result in a partial CRC signature;
calculate a new CRC signature for the at least one sector; and
combine the new CRC signature with the partial CRC signature.

12. The data storage device of claim 11, wherein the removing comprises XORing the at least one CRC signature from the total CRC signature.

13. The data storage device of claim 11, wherein combining the new CRC signature with the partial CRC signature comprises XORing the new CRC signature with the partial CRC signature to create a new total CRC signature.

14. The data storage device of claim 11, wherein the controller is configured to store the total CRC signature at an end of a flash management unit (FMU).

15. The data storage device of claim 11, wherein the removing occurs during a read modify write procedure.

16. The data storage device of claim 11, wherein the removing occurs prior to overwriting the at least one sector and after recalculating the at least one sector CRC signature.

17. The data storage device of claim 16, wherein the combining occurs after the overwriting.

18. A data storage device, comprising:
a memory means; and
a controller coupled to the memory means, wherein the controller is configured to:
update a total cyclic redundancy check (CRC) signature for a flash management unit (FMU) of the memory means by removing an outdated CRC signature corresponding to a sector of the FMU and adding in a new CRC signature corresponding to the sector.

19. The data storage device of claim 18, wherein the controller is configured to validate the total CRC signature prior to updating the total CRC signature.

20. The data storage device of claim 18, wherein updating comprises XORing the new CRC signature and XORing the outdated CRC signature.

* * * * *